US010796224B2

(12) United States Patent
Lyu et al.

(10) Patent No.: US 10,796,224 B2
(45) Date of Patent: Oct. 6, 2020

(54) IMAGE PROCESSING ENGINE COMPONENT GENERATION METHOD, SEARCH METHOD, TERMINAL, AND SYSTEM

(71) Applicant: Alibaba Group Holding Limited, Grand Cayman (KY)

(72) Inventors: Yiliang Lyu, Hangzhou (CN); Ruitao Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 135 days.

(21) Appl. No.: 16/155,756

(22) Filed: Oct. 9, 2018

(65) Prior Publication Data

US 2019/0108446 A1 Apr. 11, 2019

(30) Foreign Application Priority Data

Oct. 10, 2017 (CN) .......................... 2017 1 0936188

(51) Int. Cl.

*G06N 3/08* (2006.01)
*G06K 9/46* (2006.01)

(Continued)

(52) U.S. Cl.

CPC ............... *G06N 3/08* (2013.01); *G06F 16/51* (2019.01); *G06F 16/53* (2019.01); *G06F 16/56* (2019.01);

(Continued)

(58) Field of Classification Search

CPC .. G06N 3/08; G06N 3/04; G06F 16/53; G06F 16/51; G06F 16/56; G06K 9/46; G06K 9/6202; G06K 9/6256

See application file for complete search history.

(56) References Cited

U.S. PATENT DOCUMENTS 8,332,424 B2 12/2012 Flynn et al.
8,644,621 B2 2/2014 Sohma et al.

(Continued)

FOREIGN PATENT DOCUMENTS

WO WO2017134519 A1 8/2017

OTHER PUBLICATIONS

The PCT Search Report and Written Opinion dated Dec. 17, 2018 for PCT Application No. PCT/US2018/055077, 11 pages.

*Primary Examiner* — Leon Flores
(74) *Attorney, Agent, or Firm* — Lee & Hayes, P.C.

(57) ABSTRACT

An image processing engine component generation method, and search method, terminal, and system are provided. The image processing engine component includes: an online feature processing component operative to receive an incremental image, and determine image content feature information of the incremental image; an offline feature processing component operative to receive a stock image, and determine image content feature information of the stock image; a search platform component operative to receive a search request, the search request including search text information; and a processing engine component operative to receive image content feature information of the incremental image and the stock image, add the received image content feature information to index tables, and determine search results corresponding to the search text information. Utilization of example embodiments of the present disclosure may ensure correlation between image content feature information designated as index information in the index tables and image content, thereby ensuring the accuracy of search results.

20 Claims, 13 Drawing Sheets

Feature vectors of a same vector space 400

Image feature vector conversion model 402

Text feature vector conversion model 404

"Beijing airport"

(51) Int. Cl.

| | |
|---|---|
| ***G06K 9/62*** | (2006.01) |
| ***G06F 16/53*** | (2019.01) |
| ***G06F 16/51*** | (2019.01) |
| ***G06F 16/56*** | (2019.01) |
| *G06N 3/04* | (2006.01) |

(52) U.S. Cl.

CPC ............. *G06K 9/46* (2013.01); *G06K 9/6202* (2013.01); *G06K 9/6256* (2013.01); *G06N 3/04* (2013.01)

(56) References Cited

U.S. PATENT DOCUMENTS

| | | | | |
|---|---|---|---|---|
| 8,645,354 | B2 | 2/2014 | Kong et al. | |
| 8,929,657 | B2 | 1/2015 | Jung | |
| 8,971,641 | B2 | 3/2015 | Buchmueller et al. | |
| 9,430,478 | B2 | 8/2016 | Kong et al. | |
| 9,460,117 | B2 | 10/2016 | Jin | |
| 9,507,803 | B2 | 11/2016 | Sud et al. | |
| 9,710,491 | B2 | 7/2017 | Ke et al. | |
| 9,747,305 | B2 | 8/2017 | Cevahir et al. | |
| 2008/0082426 | A1 | 4/2008 | Gokturk et al. | |
| 2012/0072220 | A1 | 3/2012 | Zhang et al. | |
| 2012/0221587 | A1 | 8/2012 | Chen | |
| 2013/0138636 | A1* | 5/2013 | Jin | G06F 16/50 707/723 |
| 2013/0195361 | A1 | 8/2013 | Deng et al. | |
| 2015/0339359 | A1 | 11/2015 | Takaoka et al. | |
| 2017/0185670 | A1 | 6/2017 | Dua et al. | |
| 2017/0351709 | A1* | 12/2017 | Kong | G06F 16/532 |

* cited by examiner

IMAGE PROCESSING ENGINE COMPONENT GENERATION METHOD, SEARCH METHOD, TERMINAL, AND SYSTEM

CROSS REFERENCE TO RELATED PATENT APPLICATIONS

This application claims priority to Chinese Patent Application No. 201710936188.4, filed on Oct. 10, 2017 and entitled "IMAGE PROCESSING ENGINE COMPONENT GENERATION METHOD, SEARCH METHOD, TERMINAL, AND SYSTEM", which is incorporated herein by reference in its entirety.

TECHNICAL FIELD

The present disclosure involves the field of image processing technologies, and particularly involves image processing engine component generation methods, search methods, terminals, and systems.

BACKGROUND

As image searching needs of users constantly increase, various kinds of image processing engine components are developed. Currently, image searching needs of users are image searches based on content. Image searches based on content may include image searches performed based on linguistic descriptions of image content.

Image searching based on content in existing technology may, in particular, include: an image processing engine component obtaining related text information of an image, and designating the text information after quantification as image feature information; and then for image feature information of each image, building an index table as index information when searching for the image. With reference to FIG. 1, upon receiving user search text information including text information of image content, related text information of search text information may be matched based on related text information of the image (in particular, the search text information may be quantified as corresponding search feature information; and then, through comparing the correlation between image feature information recorded in an index table and search feature information, related text information is obtained). Next, an image corresponding to matching related text information is obtained, realizing the functionality of image searching.

However, in the above-mentioned image search processing procedure based on content, searching for images depends upon image feature information, and related text information of an image corresponding to the image feature information is merely descriptive information regarding the image, the descriptive information often not necessarily being the image content itself. This easily results in comparatively large differences between images found from a search and images needed by users, and poor user experiences.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

An objective of example embodiments of the present disclosure is to provide an image processing engine component generation method, and search method, terminal, and system, which may increase correlation between image feature information in index tables and image content, thereby ensuring accuracy of subsequent search results.

To solve the above-mentioned technical problem, example embodiments of the present disclosure are thus realized:

An image search system, including: a search platform component, an online feature processing component, an offline feature processing component and a processing engine component;

The online feature processing component being operative to receive an incremental image, and determine image content feature information of the incremental image;

The offline feature processing component being operative to receive a stock image, and determine image content feature information of the stock image;

The search platform component being operative to receive a search request, the search request including search text information;

The processing engine component being operative to receive image content feature information of the incremental image and the stock image, add the received image content feature information to index tables, and determine search results corresponding to the search text information.

An image processing engine component generation method, including:

Obtaining a to-be-recognized target image;

Performing image content information recognition processing upon the target image, acquiring image content feature information of the target image;

While generating an image processing engine component, adding the image content feature information of the target image to index tables of the image processing engine component.

An image search method, including:

Receiving a search request, the search request including search text information;

Determining search feature information of the search text information;

Searching for image content feature information matching the search feature information in index tables of the processing engine component;

Designating an image corresponding to the matching image content feature information as a search result of the search text information.

An image processing engine component generation apparatus, including:

A target image obtaining module operative to obtain a to-be-recognized target image;

An image content information recognizing module operative to perform image content information recognition processing upon the target image, acquiring image content feature information of the target image;

An image content index generating module operative to, while generating an image processing engine component, add the image content feature information of the target image to index tables of the image processing engine component.

An image search terminal, including:

An input device operative to receive a search request, the search request including search text information;

A communication module operative to establish a communication connection and perform data transmission;

A display operative to display information;

A processor operative to control the communication module sending search text information received by the input device to a feature processing component, control the communication module receiving search feature information of the search text information determined by the feature processing component, control the communication device to send the search feature information to a processing engine component; control the communication module to receive an image corresponding to image content feature information matching the search feature information found by the processing engine component based on searching index tables, the corresponding image being designated as a search result of the search text information, and control the display to display the search result.

An image search system, including:

A search platform component operative to receive a search request, the search request including search text information;

A feature processing component operative to determine search feature information of the search text information;

A processing engine component operative to search for image content feature information matching the search feature information in index tables of the processing engine component; and operative to designate an image corresponding to the matching image content feature information as a search result of the search text information.

A computer readable storage medium, storing computer program instructions thereon, the instructions being executable by a processor to implement the steps of the above-mentioned image processing engine component generation method.

A computer readable storage medium, storing computer program instructions thereon, the instructions being executable by a processor to implement the steps of the above-mentioned image search method.

By the technical solutions provided by the above example embodiments of the present disclosure it may be seen that, according to example embodiments of the present disclosure image content feature information effectively reflecting the actual content information of an image may be added to index tables of a processing engine component, so that when performing image search processing utilizing the image content feature information as index information, the accuracy of search results may be effectively ensured.

BRIEF DESCRIPTION OF THE DRAWINGS

To more clearly describe technical solutions of example embodiments of the present disclosure or technical solutions in existing technology, below the drawings needed in describing the example embodiments or the existing technology are introduced simply. It will be evident that the drawings described below are merely some example embodiments recorded in the present disclosure, and other drawings based on these drawings may also be derived under the premise of persons of ordinary skill in the art not expending creative labor.

DETAILED DESCRIPTION

Figure 1:
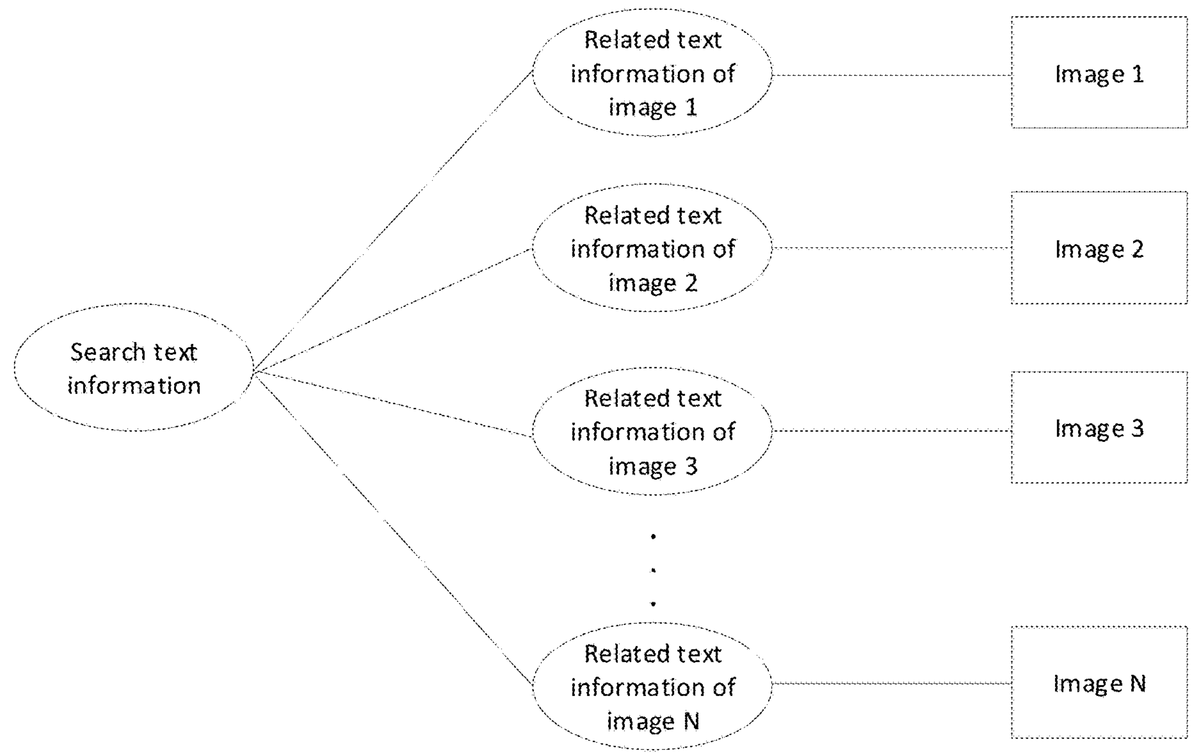
FIG. 1 is a diagram of image search processing in existing technology.

Example embodiments of the present disclosure provide image processing engine component generation methods, and search methods, terminals, and systems.

To enable persons skilled in the art to better understand the technical solutions of the present disclosure, the below, incorporating drawings of example embodiments of the present disclosure, clearly and completely describe the technical solutions of the example embodiments of the present disclosure. It is evident that the described example embodiments merely represent some example embodiments of the present disclosure, and not all example embodiments. All other example embodiments obtainable under the premise of, based on example embodiments of the present disclosure, persons of ordinary skill in the art not making use of creative labor shall belong to the scope of protection of the present disclosure.

As Internet technology advances rapidly, more and more people obtain information through the Internet, wherein, image information may confer to people the sensation of "what you see is what you get." Therefore, in some settings, to better display information to users, needed information may be provided to users by employing images. For example, an e-commerce platform may display products to users by employing images, so that users may better understand form, color and such information of products; a press conference platform may add corresponding images amidst news information, so that readers may intuitively understand information by reading, and so on. As images continuously proliferate, when a particular image needs to be searched for, after obtaining search text information that includes image content information, an image processing engine component needs to, based on correlations between index information (that is, image feature information) in an index table and search text information, extract a corresponding image. However, in existing technology, image feature information in an index table is typically text information relating to images, and related text information of images is merely descriptive information regarding images, the descriptive information often not necessarily being of image content itself. For example, when a user departing to vacation in Suzhou captures an image of a Beijing airport, actual content of the image is the Beijing airport, but related text content may be: departing, bound for Suzhou. Therefore, merely relying upon the related text content of images to extract image feature information as an index can easily lead to comparatively large differences between an image found by a search and the image needed by a user. In consideration of the comparatively large differences between image feature information (that is, index information) determined based on text information related to an image in an index table and image content, according to example embodiments of the present disclosure, correlation between index information in the index tables and the image content may be increased, thereby ensuring the accuracy of subsequent search results.

Figure 2:
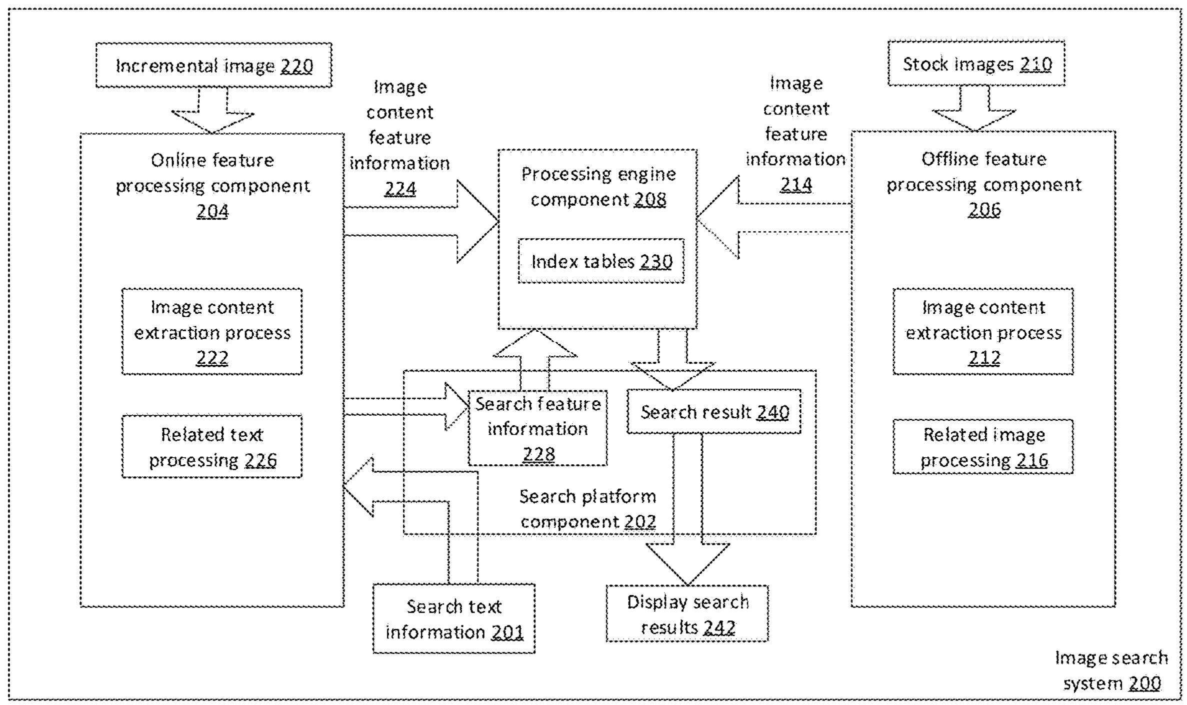
FIG. 2 is a block diagram of an example embodiment of an image search system provided by the present disclosure.

Referring to FIG. 2, an example embodiment of an image search system 200 of the present disclosure is introduced below, where in particular, the image search system may include: a search platform component 202, an online feature processing component 204, an offline feature processing component 206 and a processing engine component 208.

The search platform component 202, the online feature processing component 204, the offline feature processing component 206 and the processing engine component 208 of the image search system 200 may implement: offline image content feature information processing, image content feature information updates for real-time incremental images and online image searching.

Below, the particular implementation procedure of offline image content feature information processing is introduced:

In some settings, for example, in database initialization and offline scenarios, when a user determines image content feature information of large amounts of images, the offline feature processing component 206 may receive stock images 210. In particular, the stock images 210 may include large amounts of images needing image content feature information recognition in offline scenarios or during database initialization.

Then, the offline feature processing component 206 may perform an image content extraction process 212, performing image content information recognition processing upon the stock images 210, acquiring image content feature information 214 of the stock images 210.

In particular, image content feature information 214 according to the present example embodiment may include information capable of reflecting the image content itself. In particular, the image content feature information 214 may at least include one of the following:

An image content label, and an image feature vector.

According to a particular example embodiment, when the image content feature information 214 is the image content label, performing image content information recognition processing upon the stock images 210 and acquiring image content feature information 214 of the stock images 210 may include the following steps:

1) Inputting the stock images 210 into an image content labeling model, acquiring image content labels of the stock images 210.

2) Designating the image content labels as image content feature information 214 of the stock images 210.

In particular, here the image content labeling model may be determined by utilizing the following method:

Collecting image sets including image content labels;

Training a convolutional neural network using the image set, acquiring an image content labeling model.

According to practical applications, content information corresponding to some images is already known, and thus image content information may be labeled in advance for images having known content information, acquiring images including image content labels. Correspondingly, large amounts of image sets including image content labels may be collected in advance, as samples for subsequent training of the image content labeling model.

According to some example embodiments, image sets including image content labels may be input into a convolutional neural network set up in advance to perform training; parameters of each layer of the convolutional neural network are adjusted until currently output image content labels of the convolutional neural network match preset image content labels, and the convolutional neural network corresponding to the currently output image content labels is designated as the image content labeling model.

In the above-mentioned image content labeling model training procedure, large amounts of image sets including image content labels are used directly as training samples, which may effectively ensure recognition accuracy of the image content labeling model for image content labels of images.

In some settings, when comparatively few image sets including image content labels have been collected, there will be a deficiency of image content label information, which correspondingly impacts recognition accuracy of the image content labeling model for image content labels of images. Therefore, according to other example embodiments, during the procedure of inputting image sets including image content labels into a convolutional neural network set up in advance to perform training, images and corresponding image content labels may be mapped into a same feature space, causing distance between a feature vector corresponding to an image and a feature vector corresponding to a counterpart image content label to be less than or equal to a preset value, and subsequently, images may be matched to corresponding image content labels directly by the distance between the feature vector corresponding to the image and the feature vector corresponding to the image content label.

Figure 3:
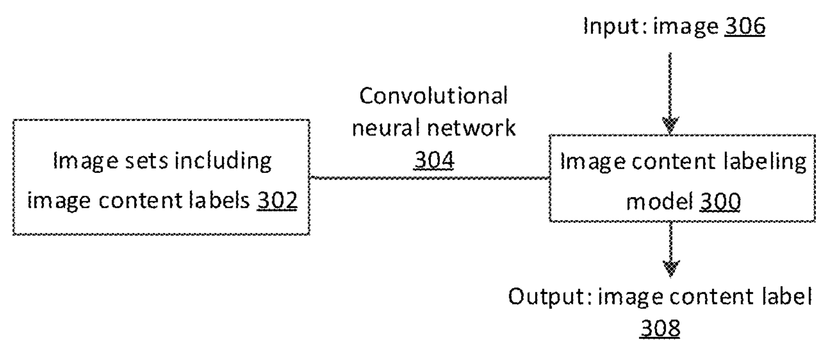
FIG. 3 is a diagram of an example embodiment of a training application of an image content labeling model provided by the present disclosure.

FIG. 3 is a diagram of an example embodiment of a training application of an image content labeling model 300 provided by the present disclosure. From the Figure it may be seen that, after acquiring an image content labeling model 300 by training (for example, training a convolutional neural network 304) based on image sets including image content labels 302, subsequently, inputting a new image (that is, an image 306) into the image content labeling model 300, the image content labeling model 300 may output an image content label 308 of the new image (that is, the image 306).

According to other example embodiments, when the image content feature information is the image feature vector, performing the image content information recognition processing upon the stock images and acquiring image content feature information of the stock images may include the following steps:

1) Inputting the stock images into an image feature vector conversion model, acquiring image feature vectors of the stock images;

2) Designating the image feature vectors as the image content feature information of the stock images.

In particular, here the image feature vector conversion model may be determined utilizing the following method:

From historical image search data, according to click data, obtaining search text information and corresponding search images;

Training a neural network model utilizing the search text information and corresponding search images, acquiring an image feature vector conversion model.

Figure 4:
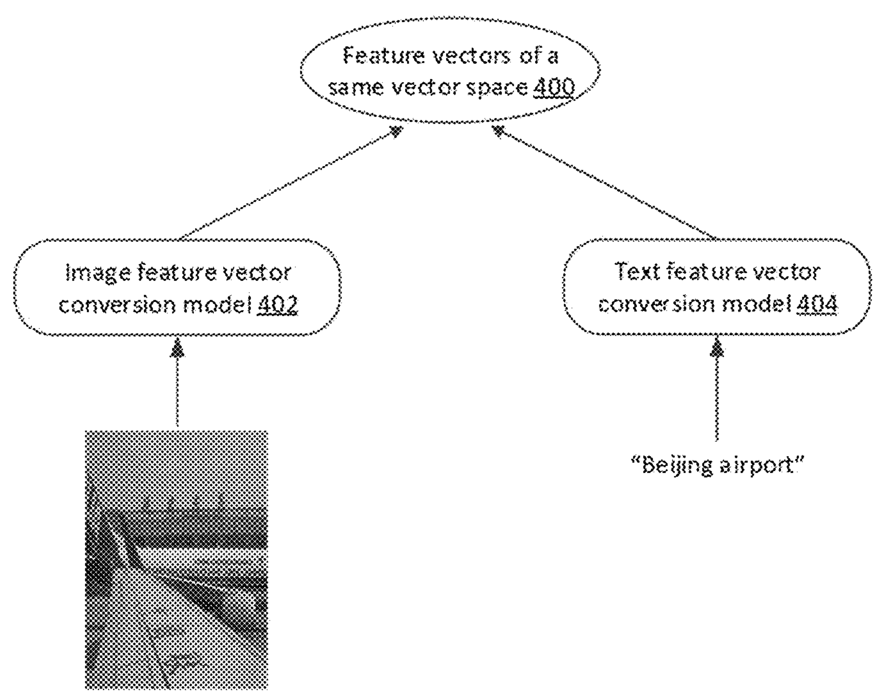
FIG. 4 is a schematic diagram of an image feature vector conversion model and a text feature vector conversion model provided by the present disclosure.

In particular, the historical image search data may include corresponding search text information and search images, and click data between the corresponding search text information and search images. Here, click data may be a number of clicks, and for example, the click data may be: when search text information is A, the number of times users clicked on search image B. As illustrated by FIG. 4, the search text information: "Beijing airport," and a corresponding clicked search information may be a training sample, and then, a neural network model is trained utilizing the search text information and corresponding search image, mapping the search text information and corresponding search image into a feature vector in a same vector space 400, causing text feature vectors corresponding to the search text information to be nearer to an image feature vector of its corresponding search image (an image that was clicked), and further from image feature vectors of non-corresponding search images (images that were not clicked), and acquiring an image feature vector conversion model 402 and a text feature vector conversion model 404.

Here the image feature vector conversion model 402 may be operative to convert an image to an image feature vector of a preset fixed length; and the text feature vector conversion model 404 may be operative to convert search text information to a text feature vector of a preset fixed length.

Figure 5:
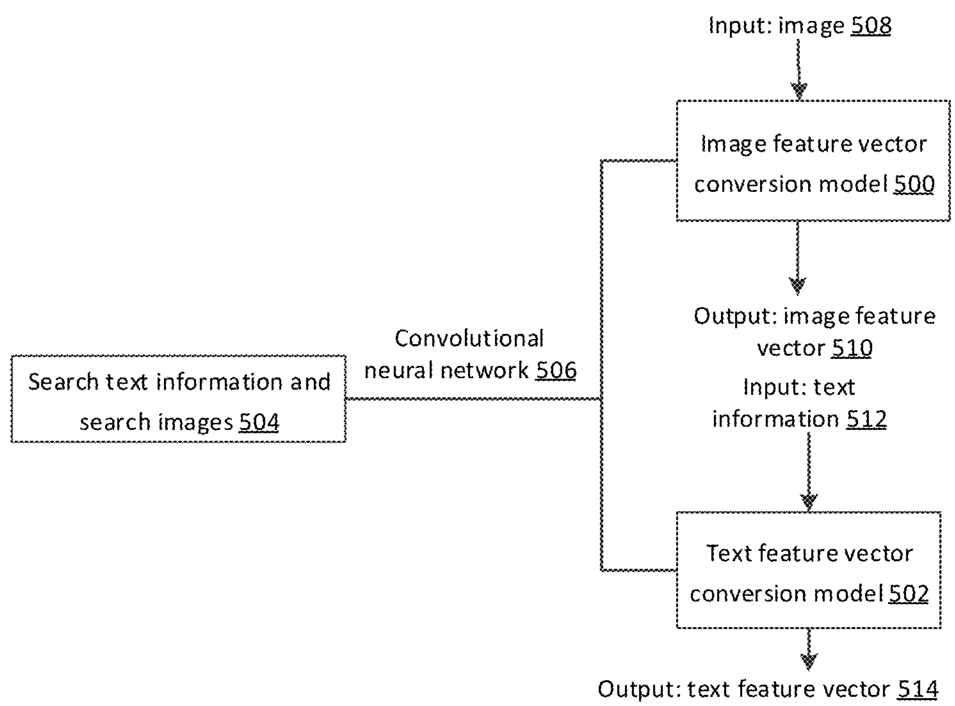
FIG. 5 is a diagram of an example embodiment of a training application of an image feature vector conversion model and text feature vector conversion model provided by the present disclosure.

FIG. 5 is a diagram of an example embodiment of a training application of an image feature vector conversion model 500 and text feature vector conversion model 502 provided by the present disclosure. In FIG. 5, a neural network (for example, a convolutional neural network 506) is trained utilizing search text information and corresponding clicked search images (that is, the search text information and search images 504), and after acquiring an image feature vector conversion model 500 and a text feature vector conversion model 502, subsequently, a new image (that is, an image 508) is input into the image feature vector conversion model 500, and the image feature vector conversion model 500 may output an image feature vector 510 of the new image (that is, the image 508); a new piece of search text information 512 is input into the text feature vector conversion model 502, and the text feature vector conversion model 502 may output a text feature vector 514 of the new piece of search text information 512. The image content feature information of the stock images is determined.

According to example embodiments of the present disclosure, by performing training directly with search images and search text information including image content information of search images as training samples, it may be ensured that the image feature vector conversion model 500 may accurately output, by conversion, image feature vectors 510 capable of reflecting the actual content information of images; at the same time, the text feature vector conversion model 502 may also accurately output, by conversion, text feature vectors 514 capable of reflecting the actual content information of images.

In practical applications, after an offline feature processing component determines new image content feature information, the new image content feature information may be sent to the processing engine component, and index tables of the processing engine component are updated with the image content feature information (image content feature information in the index tables may be designated as index information during subsequent image searches), and after the addition of index information that may be matched during subsequent image searches, image search match success rate may be better ensured.

Below, referring to FIG. 2, an image content feature information update processing procedure for real-time incremental images is introduced:

In some settings, for example in an online scenario, a user needs to add one or more kinds of images to the image search system, and correspondingly the image content feature information of the added images need to be updated. In particular, a user may, through an http interface, initiate an adding request, where the adding request may include an image that needs to be added to the image search system, that is, an incremental image 220. The online feature processing component 204 may receive the incremental image 220, and determine image content feature information 224 of the incremental image 220. In particular, here particular steps of determining image content feature information 224 of an incremental image 220 (that is, performing an image content extraction process 222) may refer to the above-mentioned related step of an offline feature processing component 206 performing image content information recognition processing upon stock images 210 (that is, performing an image content extraction process 212) to acquire image content feature information 214 of the stock images 210, which shall not be repeated herein.

In practical applications, after an online feature processing component 204 determines new image content feature information (that is, image content feature information 224), the new image content feature information (that is, the image content feature information 224) may be sent to the processing engine component 208, causing index tables 230 of the processing engine component 208 to be updated with the image content feature information 224, and after the addition of index information that may be matched during subsequent image searches, image search match success rate may be better ensured.

Below, the implementation procedure of an online image search is introduced:

First, the search platform component 202 may receive a search request, the search request including search text information 201; according to example embodiments of the present disclosure receiving the input search request includes, but is not limited to, one of the following methods: text input, voice input and code scan input.

Next, the search platform component 202 may send the search text information 201 to the online feature processing component 204, and the online feature processing component 204, after receiving the search text information 201, may determine search feature information 228 of the search text information 201.

According to an example embodiment, determining search feature information 228 of the search text information 201 may include related text processing 226 such as: performing word separation processing upon the search text information, acquiring separated search word data; and designating the separated search word data as search feature information of the search text information. According to an example embodiment of the present disclosure, suppose that search text information input by a user is "Beijing airport," and separated search word data acquired by performing word separation processing upon Beijing airport may be:

"Beijing" and "airport." Correspondingly, "Beijing" and "airport" are designated as search feature information of the search text information ("Beijing airport").

According to another example embodiment, determining search feature information 228 of the search text information 201 may include related text processing 226 such as: performing word separation processing upon the search text information, acquiring separated word data; inputting the separated word data (that is, text information 521) into the text feature vector conversion model 502, acquiring a text feature vector 514 of the search text information 201; designating the text feature vector 514 as the search feature information of the search text information 201, and matching against image feature vectors of index tables 230 of the processing engine component 208.

In particular, the determining method of the text feature vector conversion model 502 may refer to the above-mentioned related description, which shall not be repeated herein.

It should be stated that, according to example embodiments of the present disclosure, training is performed directly with search images and search text information 504 of image content information including search images as training samples, which may effectively ensure that the text feature vector conversion model 502 may accurately output, by conversion, text feature vectors capable of reflecting the actual content information of images.

After the online feature processing component 204 determines search feature information 228 of search text information 201, the search feature information 228 may be sent to the search platform component 202.

Then, the search platform component 202 may send the received search feature information 228 to the processing engine component 208;

Thereafter, the processing engine component 208, upon receiving the search feature information 228, may, based on index information (that is, image content feature information) in index tables 230, find, by searching for, image content feature information matching the search feature information 228, and designating the image corresponding to the matching image content feature information as a search result 240 sent to the search platform component 202;

According to an example embodiment, when the search feature information 228 is separated search word data, image content feature information 224 (that is, image content labels) matching the separated search word data may be searched for in index tables 230 of the processing engine component 208. In particular, this may include the below steps:

1) Searching for image content feature information 224 including the search feature information 228 in index tables of the processing engine component 208.

Here, with the search feature information "Beijing" and "airport" as an example, image content labels including "Beijing" and "airport" may be searched for in index tables 230 of the processing engine component 208 (that is, the above-mentioned image processing engine component).

2) From the image content feature information including the search feature information 228, selecting image content feature information with confidence level greater than or equal to a first threshold designated as the matching image content feature information.

In particular, the confidence level indicates a degree of association between image content feature information 224 and image content of corresponding images. By the above-mentioned example embodiment of generating image content labels of images it may be seen that image content labels are determined through the image content labeling model 300, and when inputting an image 306 into the image content labeling model 300, the image content labeling model 300 will match multiple image content labels having different confidence levels, and when outputting image content labels 308 will, based on the confidence levels of image content labels, output image content labels 308 having comparatively high precision, designated as the image content labels of this image 306.

In practical applications, incorporating the above-mentioned separated search word data "Beijing" and "airport," when multiple image content labels including "Beijing" and "airport" are found from searching, to ensure degree of matching between search results and search text information, image content labels having confidence level greater than or equal to a first threshold may be selected from multiple image content labels and designated as the matching image content labels.

Here, the first threshold may be set incorporating the degree of matching between search results and search text information needed for the practical application.

Thereafter, an image corresponding to the matching image content labels may be obtained and designated as a search result 240 of the search text information 201.

Additionally, the matching image content label(s) may include one or multiple thereof, and correspondingly, when there are multiple matching image content labels, and when sending back search results, confidence levels of image content labels may be incorporated, sending corresponding images to the search platform component 202 after being ordered according to confidence levels from largest to smallest.

According to another example embodiment, when the search feature information 228 is a text feature vector, image content feature information 224 (that is, an image feature vector) matching the text feature vector may be searched for in index tables 230 of the processing engine component 208. In particular, the following steps may be included:

1) Computing degrees of matching between the text feature vector and image feature vectors in index tables 230 of the processing engine component 208.

By the above-mentioned example embodiment of an image feature vector conversion model 500 and a text feature vector conversion model 502 acquired from training, it may be seen that the image feature vector conversion model 500 and the text feature vector conversion model 502 during the training process map search text information and corresponding search images into a same feature space, causing text feature vectors corresponding to the search text information to be nearer to an image feature vector of its corresponding search image, and further from image feature vectors of non-corresponding search images. Therefore, through computing degrees of matching between the text feature vector and image feature vectors, correlation between corresponding search text information and images may be determined. Correspondingly, search degrees of matching may characterize degrees of association between image content feature information and image content of corresponding images.

In particular, degrees of matching between text feature vectors and image feature vectors may be a Euclidean distance between two vectors, where the smaller the numerical value of the Euclidean distance acquired based on computing two vectors, the better the degree of matching between the two vectors, and the larger the numerical value of the Euclidean distance acquired based on computing two vectors, the worse the degree of matching between the two vectors.

Of course, according to example embodiments of the present disclosure, the degree of matching between two vectors is not only limited to the above-mentioned Euclidean distance, but may also include cosine distance, Manhattan distance, and the like. Additionally, in some scenarios, the degree of matching may not be a numerical value, but rather merely written representations of degrees or trends, and in these scenarios, through preset rules the contents of the written representations may be quantified as a specific value. And then, subsequently the quantified value may be utilized to determine the degree of matching between two vectors. According to a typical example, the value for some particular dimension may be "middle," and accordingly this written symbol may be quantified as a binary value or a hexadecimal value in ASCII encoding, though the degrees of matching between two vectors according to example embodiments of the present disclosure shall not be limited to the above-mentioned.

2) Evaluating whether the degrees of matching are greater than or equal to a second threshold.

3) When an evaluation result is yes, designating an image feature vector corresponding to the degree of matching greater than or equal to the second threshold as the matching image feature vector.

According to the present example embodiment, to ensure correlation between search results and search text information, the image feature vector corresponding to the degree of matching greater than or equal to the second threshold may be designated as the matching image feature vector.

Here, the second threshold may be set incorporating degree of matching between search results and search text information needed for the practical application.

Thereafter, an image corresponding to the matching image feature vector may be obtained and designated as a search result of the search text information.

Additionally, the matching image feature vector(s) may include one or multiple thereof, and correspondingly, when there are multiple matching image feature vectors, when sending back search results, degrees of matching between image feature vectors and text feature vectors may be incorporated, sending back corresponding images after being ordered according to degrees of matching from largest to smallest.

Finally, the search platform component 202 may display received search results.

According to another example embodiment, to prevent a server malfunction and the like leading to data loss and such problems, the system may further include:

A feature information database, coupled to the online feature processing component 204 and the offline feature processing component 206, and operative to store image content feature information.

In particular, the online feature processing component 204 and the offline feature processing component 206 are a same feature processing component, or may be different feature processing components; when the online feature processing component 204 and the offline feature processing component 206 are different feature processing components, the online feature processing component 204 may send determined image content feature information to the offline feature processing component 206, performing data backup.

Additionally, in practical applications, for ease of better extracting image content feature information from large amounts of images, the offline feature processing component 206, before the online feature processing component 204 extracts image content feature information from images 224, may remove duplicate images from the images, separate images by type, and perform such related image processing 216. In particular, according to example embodiments of the present disclosure, removal of duplicates from images may include, without limitation, based on related text information of images, removing images having same or similar text information.

According to example embodiments of the present disclosure, separating images by type may be based on inherent characteristics of images, separating images into content-type images, candid shot-type images, and other images. Herein, related text information for content-type images is often just the image content itself. Therefore, some images whose related text content is the image content itself are labeled as content-type images. With regard to some candid shot images, due to the requirements of the shot as well as human and such factors, related text information of the image often come in many types, often not necessarily being content information of the image. Therefore, candid shot images may be separated as candid shot-type images. Other images not belonging with content-type images or candid shot-type images may be directly separated as other images. Normally, other images, due to not having related information, cannot subsequently be added to the processing engine component 208.

Considering that different types of images have different characteristics, according to an example embodiment of the present disclosure, different methods may be employed for different types of images to obtain image content feature information capable of reflecting the actual content of images. In particular, for example, related text information of content-type images is normally straightforwardly the content information of the images. Correspondingly, text information of images may be obtained; image text labels of the images are determined based on the text information. For example, key words among extracted text information are designated as the image text labels.

Additionally, text information of content-type images includes image content information. Therefore, image text labels acquired based on text information are also a kind of image content label capable of reflecting image content information, and correspondingly, may be designated as image content feature information of images.

According to other example embodiments, with regard to some candid shot-type images, related text information of images is often not necessarily content information of the images. Correspondingly, the above-mentioned steps of performing image content information recognition processing upon images to acquire image content feature information including image content labels and/or image feature vectors may be referred to, where the particular steps thereof shall not be repeated herein.

Furthermore, when a new image (that is, an incremental image 220 with to-be-recognized image content information) needs to be added to the image search system 200, image type recognition processing may be performed upon the incremental image 220 based on an image type recognition model, to obtain the image type of the incremental image;

In particular, here the image type recognition model may be determined by utilizing the following method:

1) Collecting image sample data.

In particular, collected image sample data may include data of different image types, in order to ensure that subsequently trained image type recognition models may more accurately recognize image types of more images.

2) Performing image type labeling upon the image sample data, acquiring image sample data including image type labels.

3) Training a neural network utilizing image sample data including image type labels, acquiring an image type recognition model.

Figure 6:
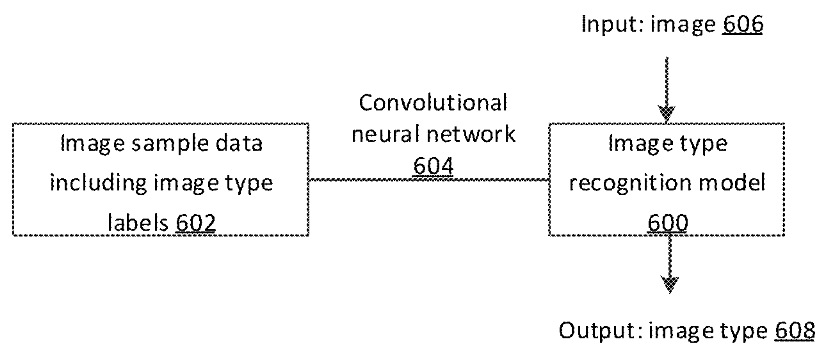
FIG. 6 is a diagram of an example embodiment of a training application of an image type recognition model provided by the present disclosure.

FIG. 6 is a diagram of an example embodiment of a training application of an image type recognition model 600 provided by the present disclosure. From the Figure it may be seen that, after acquiring an image type recognition model 600 by training based on image sample data including image type labels 602, subsequently, inputting a new image (that is, an image 606) into the image type recognition model 600, the image type recognition model 600 may output an image type 608 of the new image (that is, the image 606).

By the above-mentioned example embodiment of an image search system it may be seen that, according to the present example embodiment, image content feature information capable of effectively characterizing the actual content of images may be generated, and in the procedure of image search processing, through designating the image content feature information as a basis for matching search text information, differences between matched images and images needed by the search text information may be minimized, greatly improving the accuracy of search results.

Figure 7:
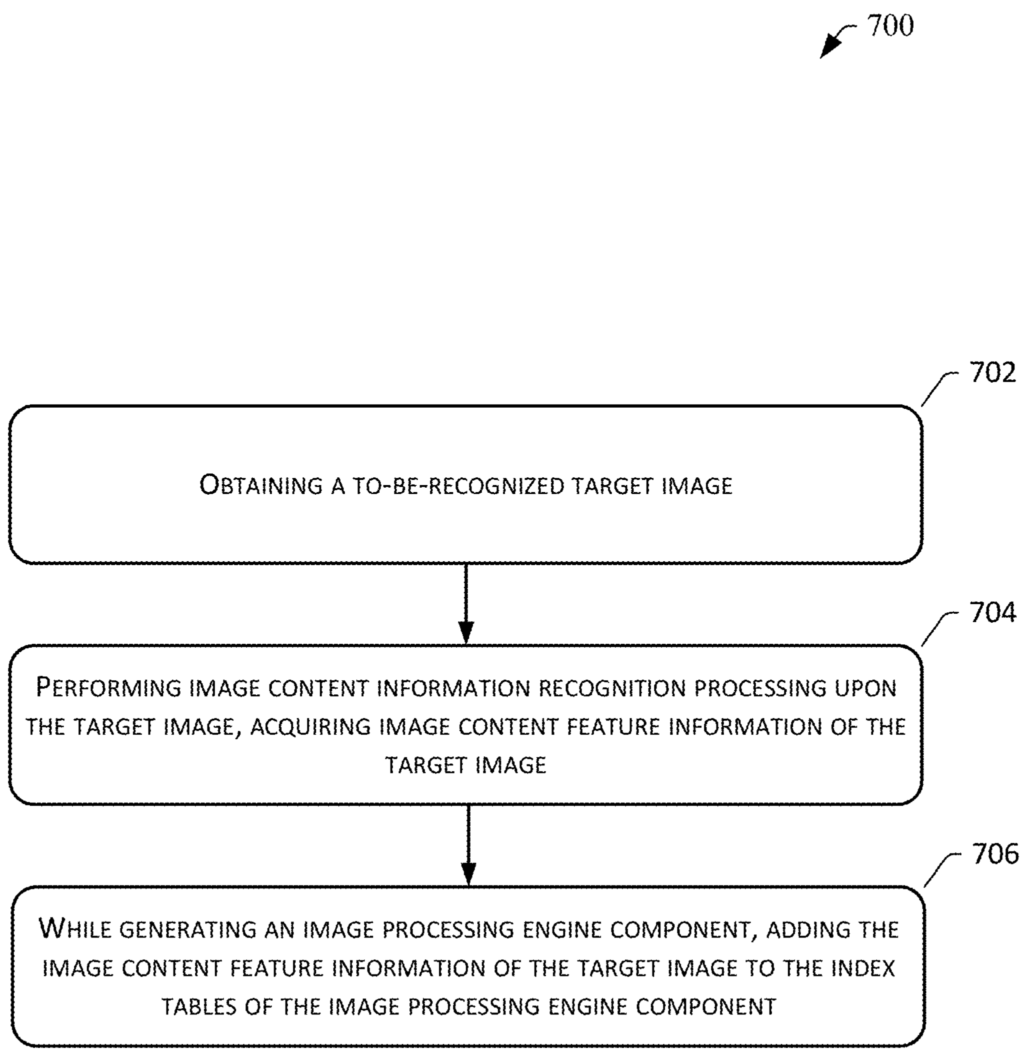
FIG. 7 is a flowchart of an example embodiment of an image processing engine component generation method provided by the present disclosure.

Based on the image content feature information capable of effectively characterizing the actual content of images as introduced above, another aspect of the present disclosure provides an example embodiment of an image processing engine component generation method. FIG. 7 is a flowchart of an example embodiment of an image processing engine component generation method 700 provided by the present disclosure. The present disclosure provides method operational steps as described by example embodiments or flowcharts, but through conventional or non-creative labor may include more or fewer operational steps. Step orders listed in the example embodiments are merely one among many possible step execution orders, not representing a sole execution order. During the practical execution of systems or client terminal products, execution in series or execution in parallel (for example, on a parallel processor or multi-threaded processing environment) may take place according to the methods illustrated by the example embodiments or the drawings. In particular, as illustrated by FIG. 7, the method 700 may include:

Step 702: Obtaining a to-be-recognized target image.

In particular, the target image may include a stock image and/or an incremental image.

Step 704: Performing image content information recognition processing upon the target image, acquiring image content feature information of the target image.

Step 706: While generating an image processing engine component, adding the image content feature information of the target image to index tables of the image processing engine component.

According to example embodiments of image processing engine component generation methods of the present disclosure, while generating an image processing engine component, the image content feature information of the target image may be added to index tables of the image processing engine component. Since image content feature information in the index tables may effectively characterize the actual content information of an image, when subsequently utilizing the image processing engine component to search for images, the accuracy of search results may be effectively ensured.

Based on the above-mentioned example embodiments of image processing engine component generation methods it may be seen that, image content feature information in index tables of an image processing engine component may include image content labels and/or image feature vectors. Below, first taking as an example performing matching between images and search text information by image content labels during an image search procedure, example embodiments of an image search method of the present disclosure are introduced:

First, a search request may be received, the search request including search text information.

Then, word separation processing may be performed upon the search text information, acquiring separated search word data; the separated search word data is designated as search feature information of the search text information, and is matched against image content labels in index tables of a processing engine component.

According to a particular example embodiment, suppose that search text information input by a user is "Beijing airport," and word separation processing is performed upon "Beijing airport," and the acquired separated search word data may be: "Beijing" and "airport." Correspondingly, "Beijing" and "airport" are designated as search feature information of the search text information ("Beijing airport").

Next, image content feature information (that is, image content labels) matching the search feature information (that is, separated search word data) may be searched for in the index tables of the processing engine component. In particular, the following steps may be included:

1) Searching for image content feature information including the search feature information in the index tables of the processing engine component.

Here, taking the search feature information "Beijing" and "airport" as an example, image content labels including "Beijing" and "airport" may be searched for in the index tables of a processing engine component (that is, the above-mentioned image processing engine component).

2) From the image content feature information including the search feature information, selecting image content feature information having a confidence level greater than or equal to a first threshold designated as the matching image content feature information.

In particular, the confidence level indicates a degree of association between image content feature information and image content of corresponding images. By the above-mentioned example embodiment of generating image content labels of images it may be seen that image content labels are determined through the image content labeling model, and when inputting an image into the image content labeling model, the image content labeling model will match multiple image content labels having different confidence levels, and when outputting image content labels will, based on the confidence levels of image content labels, output image content labels having comparatively high precision, designated as the image content labels of this image.

In practical applications, incorporating the above-mentioned separated search word data "Beijing" and "airport," when multiple image content labels including "Beijing" and "airport" are found from searching, to ensure degree of matching between search results and search text information, from multiple image content labels, image content labels having confidence level greater than or equal to a first threshold may be selected and designated as the matching image content labels.

Here, the first threshold may be set incorporating the degree of matching between search results and search text information needed for the actual application.

Finally, an image corresponding to the matching image content labels may be obtained and designated as a search result of the search text information.

Additionally, the matching image content label(s) may include one or multiple thereof, and correspondingly, when there are multiple matching image content labels, when sending back search results, images corresponding to the matching image content feature information may be ordered based on degrees of association between the matching image content feature information and image content information; in particular, confidence levels of image content labels may be incorporated, sending back corresponding images after being ordered according to confidence levels from largest to smallest.

Below, taking the matching of images with search text information by image feature vectors during the search procedure as an example, a particular example embodiment of an image search method of the present disclosure is introduced:

First, receiving a search request, the search request including search text information;

Then, word separation processing may be performed upon the search text information, acquiring separated word data; the separated word data is input into a text feature vector conversion model, acquiring a text feature vector of the search text information; the text feature vector is designated as search feature information of the search text information, and is matched with image feature vectors in index tables of the processing engine component.

In particular, the determination method of the text feature vector conversion model may refer to the above-mentioned related description, which shall not be repeated herein.

It should be stated that, according to the present example embodiment of the present disclosure, training is performed with search images and search text information of the image content information including the search images directly as training samples, which may effectively ensure that the text feature vector conversion model may accurately output, by conversion, text feature vectors capable of reflecting the actual content information of images.

Next, image content feature information (that is, image feature vectors) matching the search feature information may be searched for in the index tables of the processing engine component. In particular, the following steps may be included:

1) Computing degrees of matching of the text feature vector to image feature vectors in index tables of the processing engine component.

By the above-mentioned example embodiment of an image feature vector conversion model and a text feature vector conversion model acquired from training it may be seen that, the image feature vector conversion model and the text feature vector conversion model, during the training procedure, map search text information and corresponding search images into a same feature space, causing text feature vectors corresponding to the search text information to be nearer to an image feature vector of its corresponding search image, and further from non-corresponding image feature vectors. Therefore, through computing degrees of matching between text feature vectors and image feature vectors, degrees of association between corresponding search text information and images may be determined.

In particular, degrees of matching between text feature vectors and image feature vectors may be a Euclidean distance between two vectors, where the smaller the numerical value of the Euclidean distance acquired based on computing two vectors, the better the degree of matching between the two vectors, and the larger the numerical value of the Euclidean distance acquired based on computing two vectors, the worse the degree of matching between the two vectors.

Of course, according to example embodiments of the present disclosure, the degree of matching between two vectors is not only limited to the above-mentioned Euclidean distance, but may also include cosine distance, Manhattan distance, and the like. Additionally, in some scenarios, the degree of matching may not be a numerical value, but rather merely written representations of degrees or trends, and in these scenarios, through preset rules the contents of the written representations may be quantified as a specific value. And then, subsequently the quantified value may be utilized to determine the degree of matching between two vectors. According to a typical example, the value for some particular dimension may be "middle," and accordingly this written symbol may be quantified as a binary value or a hexadecimal value in ASCII encoding, though the degrees of matching between two vectors according to example embodiments of the present disclosure shall not be limited to the above-mentioned.

2) Evaluating whether the degrees of matching are greater than or equal to a second threshold.

3) When an evaluation result is yes, designating an image feature vector corresponding to the degree of matching greater than or equal to the second threshold as the matching image feature vector.

According to the present example embodiment, to ensure correlation between search results and search text information, the image feature vector corresponding to the degree of matching greater than or equal to the second threshold may be designated as the matching image feature vector.

Here, the second threshold may be set incorporating the degree of matching between search results and search text information needed for the actual application.

Finally, an image corresponding to the matching image feature vectors may be obtained and designated as a search result of the search text information.

Additionally, the matching image feature vector(s) may include one or multiple thereof, and correspondingly, when there are multiple matching image feature vectors, when sending back search results, images corresponding to the matching image content feature information may be ordered based on degrees of association between the matching image content feature information and image content information; in particular, degrees of matching between image feature vectors and text feature vectors may be incorporated, sending back corresponding images after being ordered according to degrees of matching from largest to smallest.

Additionally, it should be stated that, when image content feature information in index tables of the processing engine component includes image content labels and image feature vectors, during the procedure of image search processing, image text information and images may be matched by image content label and image feature vectors, and then accurate search results are determined. Particular steps may refer to the above-mentioned related example embodiments, which shall not be repeated herein.

Figure 8:
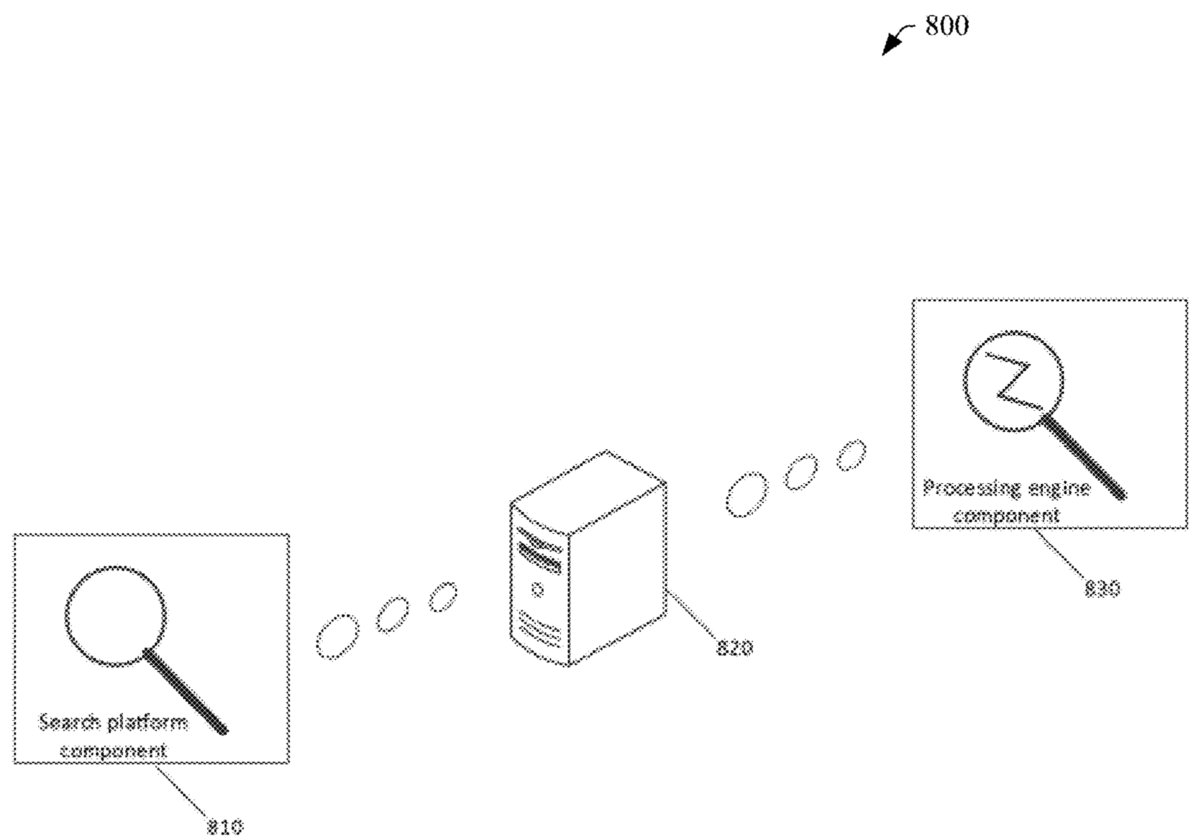
FIG. 8 is a diagram of an example embodiment of an image search system provided by the present disclosure.

Another aspect of the present disclosure provides an example embodiment of an image search system. FIG. 8 is a diagram of an example embodiment of an image search system 800 provided by the present disclosure. An image search system of an example embodiment of the present disclosure may include a search platform component 810, a feature processing component 820 and a processing engine component 830, wherein, The search platform component 810 may be operative to receive a search request, the search request including search text information;

The feature processing component 820 may be operative to determine search feature information of the search text information;

The processing engine component 830 may be operative to search for image content feature information matching the search feature information in index tables of the processing engine component; and may be operative to designate an image corresponding to the matching image content feature information as a search result of the search text information.

Figure 9:
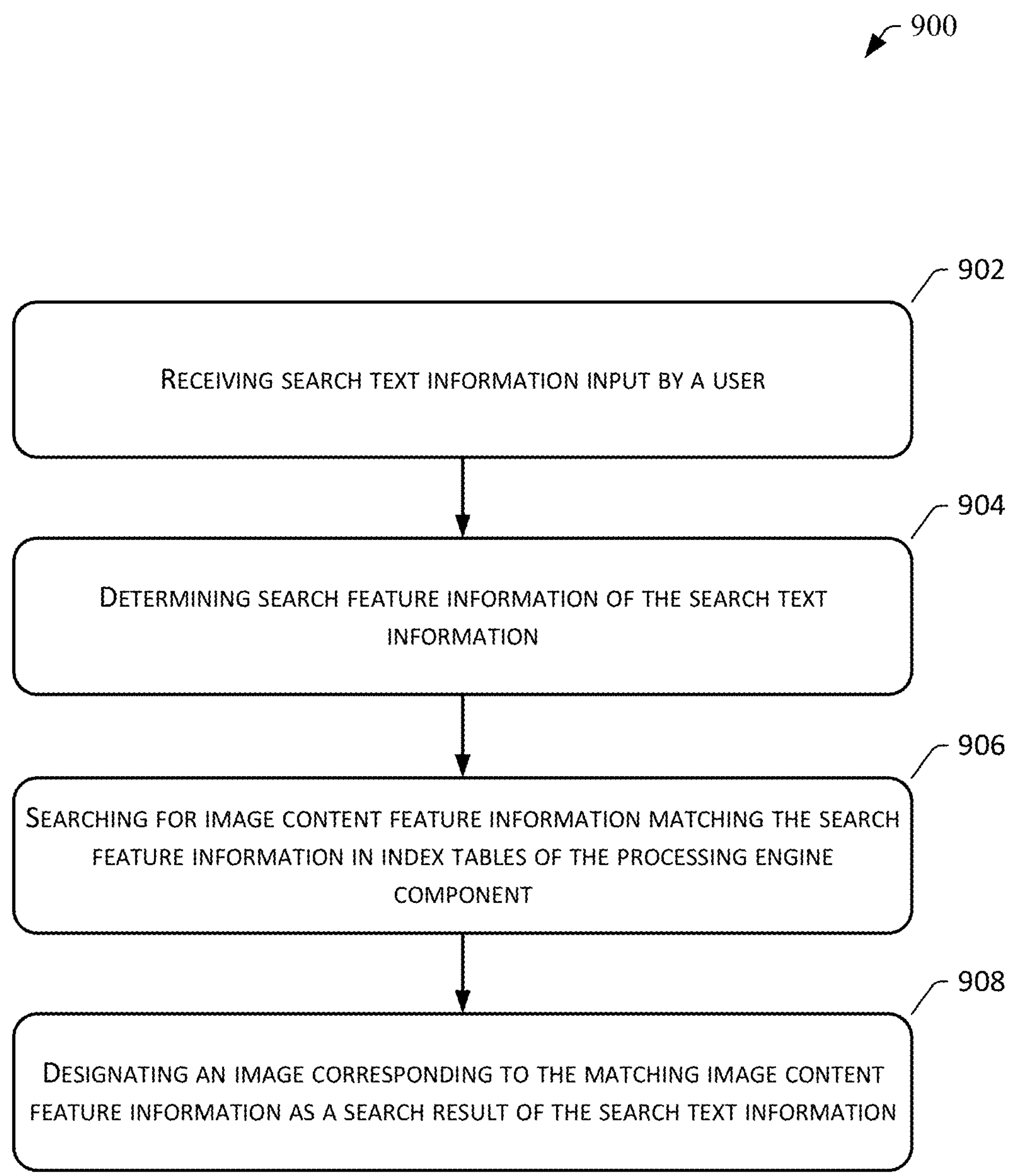
FIG. 9 is a flowchart of an example embodiment of an image search method provided by the present disclosure.

FIG. 9 is a flowchart of an example embodiment of an image search method 900 provided by the present disclosure. The present disclosure provides method operational steps as described by example embodiments or flowcharts, but through conventional or non-creative labor may include more or fewer operational steps. Step orders listed in the example embodiments are merely one among many possible step execution orders, not representing a sole execution order. During the practical execution of systems or client terminal products, execution in series or execution in parallel (for example, on a parallel processor or multithreaded processing environment) may take place according to the methods illustrated by the example embodiments or the drawings. In particular, as illustrated by FIG. 9, the method 900 may include:

Step 902: Receiving search text information input by a user (that is, receiving a search request, the search request including search text information).

Step 904: Determining search feature information of the search text information.

Step 906: Searching for image content feature information matching the search feature information in index tables of the processing engine component.

Step 908: Designating an image corresponding to the matching image content feature information as a search result of the search text information.

Figure 10:
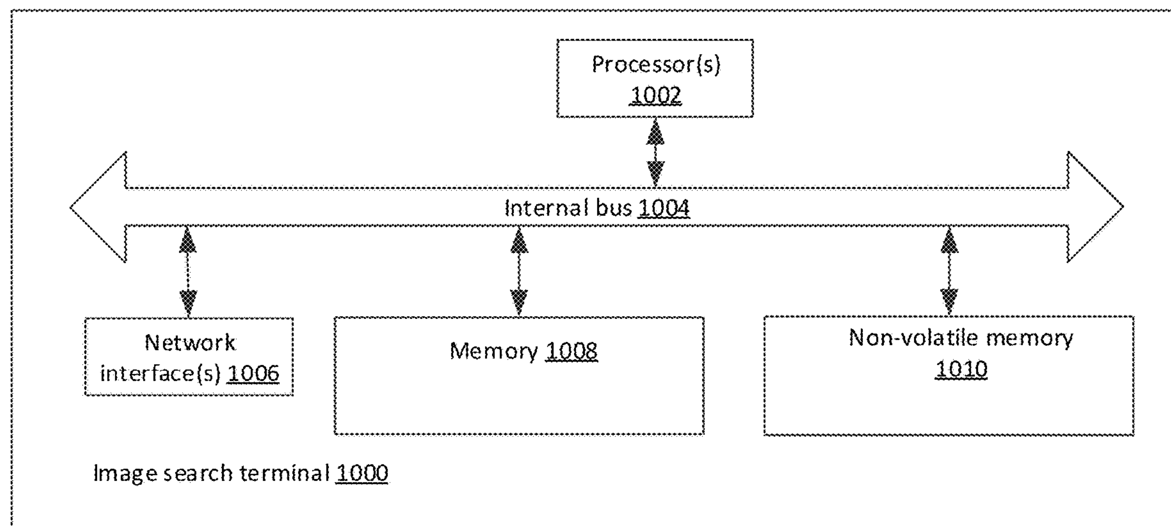
FIG. 10 illustrates a block diagram of an image search terminal based on an exemplary example embodiment of the present disclosure.

FIG. 10 illustrates a block diagram of an image search terminal 1000 based on an exemplary example embodiment of the present disclosure. Referring to FIG. 10, in the hardware layer, the terminal 1000 includes one or more processor(s) 1002, an internal bus 1004, one or more network interface(s) 1006, memory 1008, and non-volatile memory 1010, and may further include hardware required for other services. The one or more processor(s) 1002 read(s) a corresponding computer program from nonvolatile memory 1010 to memory 1008 and then execute(s) it, establishing an image search terminal at the logical level. Of course, in addition to the software implementation, this application does not exclude other implementations, such as logic devices or combinations of hardware and software, and the like, which is to say that the main execution body of the following process handling is not limited to each logical unit, but may also be a hardware or logic device.

Figure 11:
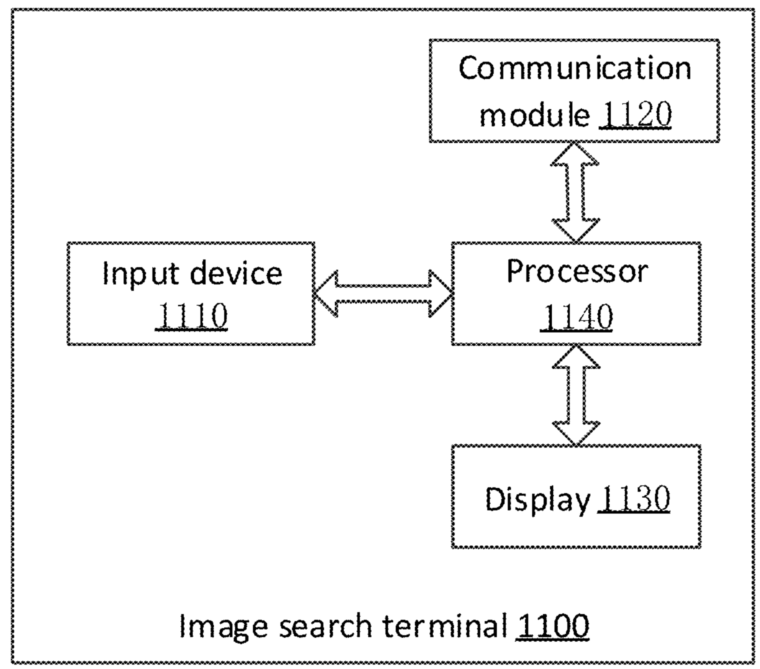
FIG. 11 is a block diagram of an example embodiment of an image search terminal provided by the present disclosure.

FIG. 11 is a block diagram of an example embodiment of an image search terminal provided by the present disclosure. Referring to FIG. 11, the image search terminal 1100 may include: an input device 1110, a communication module 1120, a display 1130 and a processor 1140;

The input device 1110 may be operative to receive a search request, the search request including search text information;

The communication module 1120 may be operative to establish a communication connection and perform data transmission;

The display 1130 may be operative to display information;

The processor 1140 may be operative to control the communication module 1120 sending search text information received by the input device to a feature processing module, control the communication module 1120 receiving search feature information of the search text information determined by the feature processing component, control the communication device 1120 to send the search feature information to a processing engine component; control the communication module 1120 to receive an image corresponding to image content feature information matching the search feature information found by the processing engine component based on searching index tables, the corresponding image being designated as a search result of the search text information, and control the display 1130 to display the search result.

In particular, according to the present example embodiment, the processor may include a central processing unit (CPU) or a graphics processing unit (GPU), and of course may also include other microcontrollers capable of logical processing, such as logic gate circuits, integrated circuits and the like, or other suitable combinations.

By the above example embodiments of image search methods, terminals, and systems of the present disclosure it may be seen that, during an image search processing procedure, according to technical solutions of the present disclosure search text information is converted to search feature information capable of effectively reflecting the actual content information of images, and the feature information is matched with image content feature information in index tables capable of effectively reflecting the actual content information of images, which may quickly and accurately match an image needed by a user corresponding to the search text information, improving user experience.

Another aspect of the present disclosure provides an image processing engine component generation server, including a processor and memory, the memory storing computer program instructions executable by the processor, the computer program instructions including:

Obtaining a to-be-recognized target image;

Performing image content information recognition processing upon the target image, acquiring image content feature information of the target image;

While generating an image processing engine component, adding the image content feature information of the target image to index tables of the image processing engine component.

In particular, according to example embodiments of the present disclosure, the processor may include a central processing unit (CPU) or a graphics processing unit (GPU), and may include other microcontrollers capable of logical processing, such as logic gate circuits, integrated circuits and the like, or other suitable combinations. Memory according to embodiments of the present disclosure may be a memory device for storing information. In a digital system, a device capable of storing binary numerical data may be memory; in an integrated circuit, a circuit having storage functionality may be memory, such as RAM, FIFO and the like; in a system, storage equipment having tangible form may be memory, and so on. In practice, data storage may be implemented using cloud storage, and implementations shall not be limited by the present disclosure.

According to another example embodiment, the image content feature information at least includes one of the following:

An image content label, and an image feature vector.

According to another example embodiment, when the image content feature information is the image content label, performing the image content information recognition processing upon a target image and acquiring image content feature information of the target image may include the following steps:

Inputting the target image into an image content labeling model, acquiring image content labels of the target image;

Designating the image content labels as the image content feature information of the target images.

Wherein, the image content labeling model is determined utilizing the following method:

Collecting image sets including image content labels;

Training a convolutional neural network using the image set, acquiring an image content labeling model.

According to another example embodiment, when the image content feature information is the image feature vector, performing the image content information recognition processing upon a target image and acquiring image content feature information of the target image may include the following steps:

Inputting the target image into an image feature vector conversion model, acquiring image feature vectors of the target image;

Designating the image feature vectors as the image content feature information of the target image;

Wherein, the image feature vector conversion model is determined by utilizing the following method:

From historical image search data, according to click data, obtaining search text information and corresponding search images;

Training a neural network model utilizing the search text information and corresponding search images, acquiring an image feature vector conversion model.

According to another example embodiment, the computer program instructions may further include:

Based on an image type recognition model, performing image type recognition processing upon a target image, acquiring an image type of the target image;

When the image type of the target image is a candid shot-type image, executing operations performing image content information recognition processing upon the target image.

According to another example embodiment, the computer program instructions may further include:

When the image type of the target image is a content-type image, obtaining text information of the target image;

Based on the text information determining image text labels of the target image, designating the image text labels as image content feature information of the target image.

Figure 12:
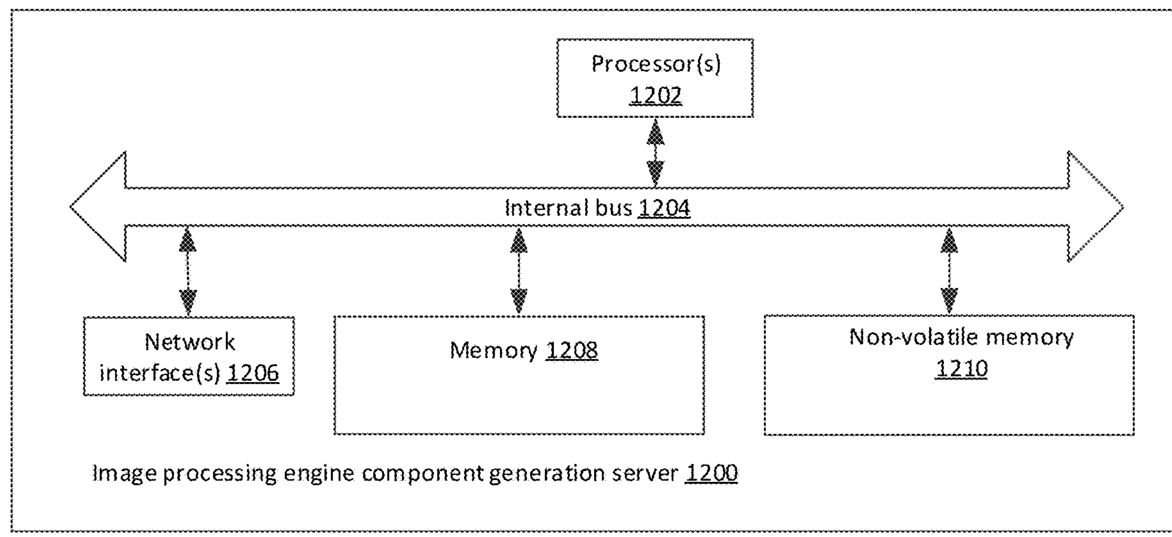
FIG. 12 illustrates a block diagram of an image processing engine component generation server according to an exemplary example embodiment of the present disclosure.

FIG. 12 illustrates a block diagram of an image processing engine component generation server 1200 according to an exemplary example embodiment of the present disclosure. Referring to FIG. 12, in the hardware layer, the server 1200 includes one or more processor(s) 1202, an internal bus 1204, one or more network interface(s) 1206, memory 1208, and non-volatile memory 1210, and may further include hardware required for other services. The one or more processor(s) 1202 read(s) a corresponding computer program from nonvolatile memory 1210 to memory 1208 and then executes it, establishing an image capture direction recognition device at the logical level. Of course, in addition to the software implementation, this application does not exclude other implementations, such as logic devices or combinations of hardware and software, and the like, which is to say that the main execution body of the following process handling is not limited to each logical unit, but may also be a hardware or logic device.

Figure 13:
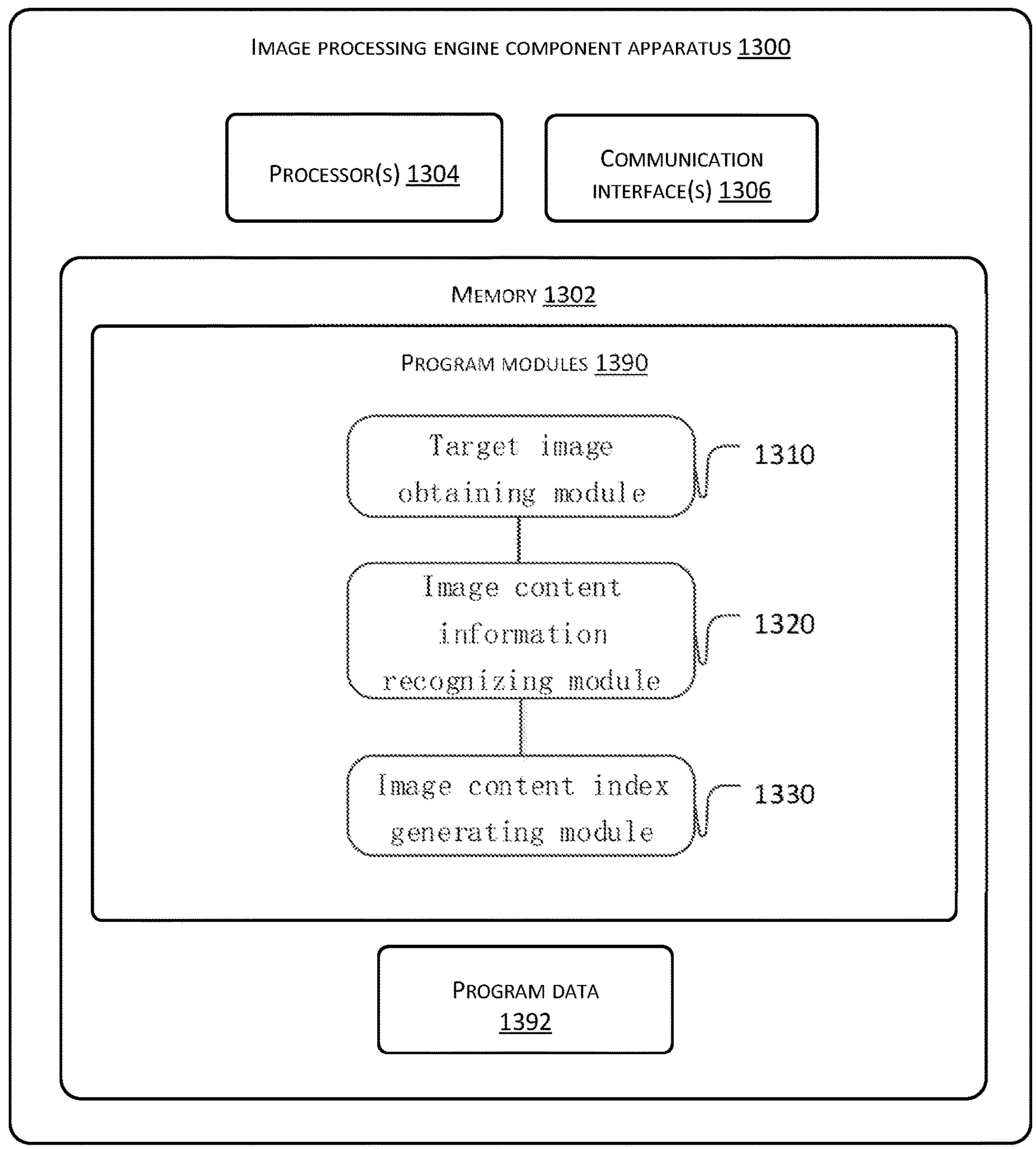
FIG. 13 is a block diagram of an example embodiment of an image processing engine component generation apparatus provided by the present disclosure.

FIG. 13 is a block diagram of an example embodiment of an image processing engine component generation apparatus 1300 provided by the present disclosure. Referring to FIG. 13, the image processing engine component generation apparatus 1300 may include: memory 1302, one or more processor(s) 1304, and one or more communication interface(s) 1306. The image processing engine component generation apparatus 1300 may further include a target image obtaining module 1310, an image content information recognizing module 1320, and an image content index generating module 1330, wherein:

Memory 1302 is operative to store program instructions and/or data.

One or more processor(s) 1304, through reading program instructions and/or data stored on memory 1302, is operative to execute processes as follows:

The target image obtaining module 1310 is stored in the memory 1302 and may be executed by the one or more processor(s) 1302 to cause the one or more communication interface(s) 1306 to obtain a to-be-recognized target image;

The image content information recognizing module 1320 is stored in the memory 1302 and may be executed by the one or more processor(s) 1302 to cause the one or more processor(s) 1302 to perform image content information recognition processing upon the target image, acquiring image content feature information of the target image;

The image content index generating module 1330 is stored in the memory 1302 and may be executed by the one or more processor(s) 1302 to cause the one or more processor(s) 1302 to, while generating an image processing engine component, add the image content feature information of the target image to index tables of the image processing engine component;

Example embodiments of the present application further disclose a computer readable storage medium, wherein the computer readable storage medium stores instructions which, when running on a computer, enable the computer to perform the processes described above.

The memory 1302 may include a form of computer readable media such as a volatile memory, a random access memory (RAM) and/or a non-volatile memory, for example, a read-only memory (ROM) or a flash RAM. The memory 1302 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1302 may include program modules 1390 and program data 1392. The program modules 1390 may include one or more of the modules as described in above.

By the above-mentioned example embodiment of an image search system it may be seen that, according to the present example embodiment, through designating image content feature information capable of effectively characterizing the actual content of images as a basis for matching search text information in the procedure of image search processing, differences between matched images and images needed by the search text information may be minimized, greatly improving the accuracy of search results.

In the 1990s, technological improvements were clearly differentiated between hardware improvements (for example, improvements to diodes, transistors, switches, etc.) or software improvements (improvements to methods and processes). However, with the development of technology, many improvement to methods and processes can be regarded as direct improvements to hardware circuit structure. Through programming improved methods and processes into hardware circuits, corresponding hardware circuit structure is obtained. Therefore, it cannot be said that an improvement to a method or process cannot be implemented using hardware modules. For example, a Programmable Logic Device (PLD), such as a Field Programmable Gate Array (FPGA), is such an integrated circuit, having logic function determined by a user's programming of the device. A digital system is "integrated" on a PLD, without the need to request the chip manufacturer to design and produce a dedicated integrated circuit chip. Presently, instead of manually manufactured IC chips, such programming is often implemented using "logic compiler" software, which is similar to a software compiler used in program development, and the original code to be compiled must be written in a specific programming language, with Hardware Description Language (HDL) being one example among many, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), and the like; presently, the most commonly used are VHDL (Very-High-Speed Integrated Circuit Hardware Description Language) and Verilog. Persons skilled in the art will appreciate that logic programming in the above hardware description languages may program improvements to methods and processes into an integrated circuit, thus obtaining a hardware circuit that implements the logic of the methods and processes.

A controller may be implemented in any suitable manner. For example, the controller may be in the form of a microprocessor or a processor and a computer readable medium storing computer readable program code (for example, software or firmware) executable by the (micro) processor, a logic gate, a switch, an application-specific integrated circuit (ASIC), a programmable logic controller, or an embedded microcontroller. Examples of controllers include, but are not limited to, the following microcontrollers: ARC 625D, Atmel AT91SAM, Microchip PIC18F26K20, and Silicone Labs C8051F320. A memory controller may also be implemented as a part of control logic of a memory. Persons skilled in the art will also appreciate that the controller may be implemented by using pure computer readable program code, and in addition, the method steps may be logically programmed to enable the controller to implement the same function in the form of a logic gate, a switch, an ASIC, a programmable logic controller or an embedded microcontroller. Therefore, this type of controller may be regarded as a hardware component, and apparatuses included in the controller for implementing various functions may also be considered as structures within the hardware component. Alternatively, the apparatuses used for implementing various functions may be regarded as both software modules for implementing the method and structures within the hardware component.

The system, apparatus, module or unit illustrated in the above example embodiments may be implemented by using a computer chip or an entity, or a product having a particular function. A typical implementation device may be a computer. In particular, examples of computers may include personal computers, laptops, cellular phones, camera phones, smartphones, personal digital assistants, media players, navigation devices, e-mail devices, game consoles, tablet computers, wearable devices, or a combination of any of the foregoing devices.

For ease of description, when the foregoing apparatus is described, it is divided into various units based on functions for respective descriptions. In implementations of the present disclosure, functions of the units may be implemented in one or in a plurality of software and/or hardware.

Persons skilled in the art will appreciate that embodiments of the invention may be provided as methods, devices, or computer program products. Therefore, the present disclosure may take the form of fully hardware embodiments, software embodiments implemented on hardware, or embodiments combining aspects of software and hardware. Furthermore, the invention may take the form of computer program products implemented on one or more computer-readable storage media (including, but not limited to, disk storage, CD-ROM, optical storage, and the like) containing computer-executable program instructions.

The present disclosure is described by reference to methods, equipment (devices), flowcharts and/or block diagrams of computer program products of embodiments of the invention. It should be appreciated that a computer program instruction may implement each flow and/or block of a flowchart and/or block diagram, or a combination of flows and/or blocks in flowcharts and/or block diagrams. These computer program instructions may be provided to a general-purpose computer, a specialized computer, an embedded processor, or other programmable data processing equipment to produce a machine, where executing an instruction by a processor of a computer or other programmable data processing device produces a device for implementing functions specified in one or more flows of a flowchart and/or one or more blocks of a block diagram.

The computer program instructions may also be stored on a computer readable memory capable of causing a computer or other programmable data processing device to work in a specific way, causing instructions stored on the computer readable memory to produce an article of manufacture including an instruction device, the instruction device implementing the functions specified in one or more flows of a flowchart and/or one or more blocks of a block diagram.

The computer program instructions may also be loaded on a computer or other programmable data processing device, where executing a series of steps on the computer or other programmable data processing device produces a computer-implemented process, where instructions executed on the computer or other programmable data processing device provide steps implementing the functions specified in one or more flows of a flowchart and/or one or more blocks of a block diagram.

In a typical configuration, a computing device includes one or more processors (CPU), an input/output interface, a network interface, and a memory.

Memory may include a volatile memory, a random access memory (RAM) and/or a non-volatile memory or the like in a computer-readable medium, for example, a read only memory (ROM) or a flash RAM. The memory is an example of the computer-readable medium.

The computer-readable medium includes non-volatile and volatile media as well as movable and non-movable media, and may implement information storage by means of any method or technology. Information may be a computer-readable instruction, a data structure, and a module of a program or other data. An example of the storage medium of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission medium, and may be used to store information accessible by the computing device. According to the definition in this text, the computer-readable medium does not include transitory computer-readable media (transitory media) such as a modulated data signal and carrier.

It should also be noted that the terms "include," "including," or any other variations thereof are intended to cover non-exclusive inclusions, such that the inclusion of a series of elements in a process, method, article, or apparatus includes not only those elements, but also includes other elements not explicitly listed, or include elements that are inherent to such processes, methods, article, or apparatus. Where no further limitation is given, an element defined by the phrase "includes a . . . " does not exclude the existence of another identical element in the process, method, article, or apparatus including the element.

The present disclosure may be described in a common context of a computer executable instruction executed by a computer, for example, a program module. Generally, the program module includes a routine, a program, an object, an assembly, a data structure, and the like used for executing a specific task or implementing a specific abstract data type. The present disclosure may also be practiced in distributed computing environments. In these distributed computing environments, a task is executed by using remote processing devices connected through a communications network. In the distributed computing environments, the program module may be located in local and remote computer storage media including a storage device.

The example embodiments in this specification are described progressively, identical or similar parts of the example embodiments may be obtained with reference to each other, and each example embodiment emphasizes a part different from other example embodiments. Especially, the system example embodiment is basically similar to the method example embodiment and is therefore described simply. For related parts, reference may be made to the descriptions of the parts in the method example embodiment.

Although the present disclosure is described through example embodiments, those of ordinary skill in the art will appreciate that the present disclosure has many variations and changes without departing from the spirit of the present disclosure, and it is expected that the appended claims cover the variations and changes without departing from the spirit of the present disclosure.

The present disclosure may further be understood with clauses as follows.

Clause 1. An image search system, comprising: a search platform component, an online feature processing component, an offline feature processing component and a processing engine component;

the online feature processing component being operative to receive an incremental image, and determine image content feature information of the incremental image;

the offline feature processing component being operative to receive a stock image, and determine image content feature information of the stock image;

the search platform component being operative to receive a search request, the search request including search text information; and the processing engine component being operative to receive image content feature information of the incremental image and the stock image, add the received image content feature information to index tables, and determine search results corresponding to the search text information.

Clause 2. The system of clause 1, the search platform component being further operative to send the search text information to the online feature processing component;

the online feature processing component being further operative to determine search feature information of the search text information;

the search platform component being further operative to receive search feature information, and send the search feature information to the processing engine component; and the processing engine component being further operative to, upon receiving the search feature information, based on index tables, find, by searching for, image content feature information matching the search feature information, and designating the image corresponding to the matching image content feature information as a search result sent to the search platform component;

the search platform component being further operative to display the search results.

Clause 3. The system of one of the clauses 1 or 2, further comprising:

a feature information database, coupled to the online feature processing component and the offline feature processing component, and operative to store image content feature information.

Clause 4. The system of one of the clauses 1 or 2, wherein the online feature processing component and the offline feature processing component are a same feature processing component.

Clause 5. An image processing engine component generation method, comprising:

obtaining a to-be-recognized target image;

performing image content information recognition processing upon the target image, acquiring image content feature information of the target image; and while generating an image processing engine component, adding the image content feature information of the target image to index tables of the image processing engine component.

Clause 6. The method of clause 5, wherein the image content feature information comprises at least one of the following:

an image content label, and an image feature vector.

Clause 7. The method of clause 6, further comprising when the image content feature information is the image content label, performing the image content information recognition processing upon the target image and acquiring image content feature information of the target image;

wherein when the image content feature information is the image content label, performing the image content information recognition processing upon the target image and acquiring image content feature information of the target image comprises:

inputting the target image into an image content labeling model, acquiring image content labels of the target image; and designating the image content labels as the image content feature information of the target image;

wherein, the image content labeling model is determined by utilizing the following method:

collecting image sets including image content labels; and training a convolutional neural network using the image set, acquiring an image content labeling model.

Clause 8. The method of clause 6, further comprising when the image content feature information is the image feature vector, performing the image content information recognition processing upon the target image and acquiring image content feature information of the target image;

wherein when the image content feature information is the image feature vector, performing the image content information recognition processing upon the target image and acquiring image content feature information of the target image comprises:

inputting the target image into an image feature vector conversion model, acquiring image feature vectors of the target image; and designating the image feature vectors as the image content feature information of the target image;

wherein, the image feature vector conversion model is determined by utilizing the following method:

from historical image search data, according to click data, obtaining search text information and corresponding search images; and training a neural network model utilizing the search text information and corresponding search images, acquiring an image feature vector conversion model.

Clause 9. The method of one of the clauses 5 to 8, further comprising:

based on an image type recognition model, performing image type recognition processing upon the target image, acquiring an image type of the target image; and when the image type of the target image is a candid shot-type image, executing operations performing image content information recognition processing upon the target image.

Clause 10. The method of clause 9, further comprising:

when the image type of the target image is a content-type image, obtaining text information of the target image; and based on the text information determining image text labels of the target image, designating the image text labels as image content feature information of the target image.

Clause 11. An image search method, comprising:

receiving a search request, the search request including search text information;

determining search feature information of the search text information;

searching for image content feature information matching the search feature information in index tables of a processing engine component; and designating an image corresponding to the matching image content feature information as a search result of the search text information.

Clause 12. The method of clause 11, wherein the search feature information comprises at least one of the following:

separated search word data, and a text feature vector.

Clause 13. The method of clause 12, wherein when the search feature information is separated search word data, determining search feature information of the search text information comprises:

performing word separation processing upon the search text information, acquiring separated search word data.

Clause 14. The method of one of the clauses 11 to 13, wherein searching for image content feature information matching the search feature information in index tables of the processing engine component comprises:

searching for image content feature information including the search feature information in index tables of the processing engine component;

from the image content feature information including the search feature information, selecting image content feature information with confidence level greater than or equal to a first threshold designated as the matching image content feature information;

wherein, the confidence level indicates accuracy of matching between image content feature information and image content of corresponding images.

Clause 15. The method of clause 12, wherein when the search feature information is a text feature vector, determining search feature information of the search text information comprises:

performing word separation processing upon the search text information, acquiring separated word data; and inputting the separated word data into a text feature vector conversion model, acquiring a text feature vector of the search text information;

wherein, the text feature vector conversion model is determined by utilizing the following method:

from historical image search data, according to click data, obtaining search text information and corresponding search images; and training a neural network model utilizing the search text information and corresponding search images, acquiring a text feature vector conversion model.

Clause 16. The method of one of the clauses 11, 12 or 15, wherein searching for image content feature information matching the search feature information in index tables of the processing engine component comprises:

computing degrees of matching between the text feature vector and image feature vectors in index tables of the processing engine component;

evaluating whether the degrees of matching are greater than or equal to a second threshold; and when an evaluation result is yes, designating an image feature vector corresponding to the degree of matching greater than or equal to the second threshold as the matching image feature vector.

Clause 17. The method of one of the clauses 11 or 12, further comprising:

when the matching image content feature information is a plurality thereof, based on a degree of association between the matching image content feature information and image content information, ordering images corresponding to the matching image content feature information; and correspondingly, designating the images corresponding to the matching image content feature information as search results of the search text information comprises designating the images corresponding to matching image content feature information after ordering as search results of the search text information.

Clause 18. An image processing engine component generation server, comprising a processor and memory, the memory storing computer program instructions executable by the processor, the computer program instructions comprising:

obtaining a to-be-recognized target image;

performing image content information recognition processing upon the target image, acquiring image content feature information of the target image; and while generating an image processing engine component, adding the image content feature information of the target image to index tables of the image processing engine component.

Clause 19. The server of clause 18, wherein the image content feature information comprises at least one of the following:

an image content label, and an image feature vector.

Clause 20. The server of clause 19, wherein when the image content feature information is the image content label, performing the image content information recognition processing upon the target image and acquiring image content feature information of the target image comprises:

inputting the target image into an image content labeling model, acquiring image content labels of the target image; and designating the image content labels as the image content feature information of the target images;

wherein, the image content labeling model is determined utilizing the following method:

collecting image sets including image content labels; and training a convolutional neural network using the image set, acquiring an image content labeling model.

Clause 21. The server of clause 19, wherein when the image content feature information is the image feature vector, performing the image content information recognition processing upon the target image and acquiring image content feature information of the target image comprises:

inputting the target image into an image feature vector conversion model, acquiring image feature vectors of the target image; and designating the image feature vectors as the image content feature information of the target image;

wherein, the image feature vector conversion model is determined utilizing the following method:

from historical image search data, according to click data, obtaining search text information and corresponding search images;

training a neural network model utilizing the search text information and corresponding search images, acquiring an image feature vector conversion model.

Clause 22. The server of one of the clauses 18 to 21, wherein the computer program instructions further comprise:

based on an image type recognition model, performing image type recognition processing upon the target image, acquiring an image type of the target image; and when the image type of the target image is a candid shot-type image, executing operations performing image content information recognition processing upon the target image.

Clause 23. The server of clause 22, wherein the computer program instructions further comprise:

when the image type of the target image is a content-type image, obtaining text information of the target image; and based on the text information determining image text labels of the target image, designating the image text labels as image content feature information of the target image.

Clause 24. An image processing engine component generation apparatus, comprising:

a target image obtaining module operative to obtain a to-be-recognized target image;

an image content information recognizing module operative to perform image content information recognition processing upon the target image, acquiring image content feature information of the target image; and an image content index generating module operative to, while generating an image processing engine component, add the image content feature information of the target image to index tables of the image processing engine component.

Clause 25. An image search terminal, comprising:

an input device operative to receive a search request, the search request including search text information;

a communication module operative to establish a communication connection and perform data transmission;

a display operative to display information; and a processor operative to control the communication module sending search text information received by the input device to a feature processing module, control the communication module receiving search feature information of the search text information determined by the feature processing component, control the communication device to send the search feature information to a processing engine component; control the communication module to receive an image corresponding to image content feature information matching the search feature information found by the processing engine component based on searching index tables, the corresponding image being designated as a search result of the search text information, and control the display to display the search result.

Clause 26. The terminal of clause 25, wherein the search feature information comprises at least one of the following:

separated search word data, and a text feature vector.

Clause 27. An image search system, comprising:

a search platform component operative to receive a search request, the search request including search text information;

a feature processing component operative to determine search feature information of the search text information; and a processing engine component operative to search for image content feature information matching the search feature information in index tables of the processing engine component; and operative to designate an image corresponding to the matching image content feature information as a search result of the search text information.

Clause 28. A computer readable storage medium, storing computer program instructions thereon, the instructions being executable by a processor to implement the steps of the method of any of the clauses 5 to 10.

Clause 29. A computer readable storage medium, storing computer program instructions thereon, the instructions being executable by a processor to implement the steps of the method of any of the clauses 11 to 17.

What is claimed is:

1. A method comprising:

obtaining a to-be-recognized target image;

performing image content information recognition processing upon the target image;

inputting the target image into an image feature vector conversion model;

acquiring image content feature information of the target image, the image content feature information including an image feature vector, the acquiring the image content feature information of the target image including acquiring image feature vectors of the target image;

designating the image feature vectors as the image content feature information of the target image; and adding, while generating an image processing engine component, the image content feature information of the target image to index tables of the image processing engine component.

2. The method of claim 1, wherein the image content feature information further includes an image content label.

3. The method of claim 1 wherein:

the image content feature information further comprises an image content label; and the method further comprises:

inputting the target image into an image content labeling model;

acquiring image content labels of the target image; and designating the image content labels as the image content feature information of the target image;

wherein the image content labeling model is determined by:

collecting image sets including image content labels; and training a convolutional neural network using the image set, and acquiring the image content labeling model.

4. The method of claim 1, wherein the image feature vector conversion model is determined by:

obtaining from historical image search data, according to click data, search text information and corresponding search images; and training a neural network model utilizing the search text information and corresponding search images, and acquiring the image feature vector conversion model.

5. The method of claim 1, further comprising:

based on an image type recognition model, performing image type recognition processing upon the target image, and acquiring an image type of the target image; and executing, upon acquiring the image type of the target image as a candid shot-type image, operations performing image content information recognition processing upon the target image.

6. The method of claim 5, further comprising:

obtaining, upon acquiring the image type of the target image as a content-type image, text information of the target image; and determining, based on the text information, image text labels of the target image, and designating the image text labels as image content feature information of the target image.

7. A method comprising:

receiving a search request, the search request including search text information;

determining search feature information of the search text information, the determining the search feature information of the search text information including:

performing word separation processing upon the search text information;

acquiring separated word data;

inputting the separated word data into a text feature vector conversion model; and acquiring a text feature vector of the search text information;

searching for image content feature information matching the search feature information in index tables of a processing engine component; and designating an image corresponding to the matching image content feature information as a search result of the search text information.

8. The method of claim 7, wherein the searching for the image content feature information matching the search feature information in the index tables of the processing engine component comprises:

searching for the image content feature information including the search feature information in the index tables of the processing engine component;

from the image content feature information including the search feature information, selecting image content feature information with confidence level greater than or equal to a first threshold designated as the matching image content feature information;

wherein, the confidence level indicates accuracy of matching between image content feature information and image content of corresponding images.

9. The method of claim 7, wherein the search feature information comprises at least one of the following:

separated search word data, and a text feature vector.

10. The method of claim 9, wherein the search feature information is separated search word data.

11. The method of claim 9, wherein the search feature information is the text feature vector;

wherein, the text feature vector conversion model is determined by:

obtaining from historical image search data, according to click data, search text information and corresponding search images; and training a neural network model utilizing the search text information and corresponding search images, and acquiring a text feature vector conversion model.

12. The method of claim 7, wherein the searching for the image content feature information matching the search feature information in the index tables of the processing engine component comprises:

computing degrees of matching between the text feature vector and image feature vectors in the index tables of the processing engine component;

evaluating whether the degrees of matching are greater than or equal to a second threshold; and designating, upon an evaluation result being yes, an image feature vector corresponding to the degree of matching greater than or equal to the second threshold as the matching image feature vector.

13. The method of claim 7, wherein the matching image content feature information is a plurality thereof, and further comprising:

ordering, based on a degree of association between the matching image content feature information and image content information, images corresponding to the matching image content feature information; and designating the images corresponding to the matching image content feature information as search results of the search text information.

14. The method of claim 13, wherein the designating the images corresponding to the matching image content feature information as the search results of the search text information comprises designating the images corresponding to matching image content feature information after ordering as search results of the search text information.

15. A server comprising:

one or more processors; and one or more memories storing therein computer program instructions that, when executed by the one or more processors, cause the one or more processors to perform acts comprising:

obtaining a to-be-recognized target image;

performing image content information recognition processing upon the target image;

inputting the target image into an image feature vector conversion model;

acquiring image content feature information of the target image, the image content feature information including an image feature vector, the acquiring the image content feature information of the target image including acquiring image feature vectors of the target image;

designating the image feature vectors as the image content feature information of the target image; and adding, while generating an image processing engine component, the image content feature information of the target image to index tables of the image processing engine component.

16. The server of claim 15, wherein the image content feature information further includes an image content label.

17. The server of claim 15, wherein the image content feature information further comprises an image content label, and the acts further comprise:

inputting the target image into an image content labeling model;

acquiring image content labels of the target image; and designating the image content labels as the image content feature information of the target images;

wherein, the image content labeling model is determined by:

collecting image sets including image content labels; and training a convolutional neural network using the image set, and acquiring an image content labeling model.

18. The server of claim 15, wherein, the image feature vector conversion model is determined by:

from historical image search data, according to click data, obtaining search text information and corresponding search images; and training a neural network model utilizing the search text information and corresponding search images, acquiring an image feature vector conversion model.

19. The server of claim 15, wherein the acts further comprise:

performing, based on an image type recognition model, image type recognition processing upon the target image, and acquiring an image type of the target image; and executing, upon acquiring the image type of the target image as a candid shot-type image, operations performing image content information recognition processing upon the target image.

20. The server of claim 19, wherein the acts further comprise:

obtaining, upon acquiring the image type of the target image as a content-type image, obtaining text information of the target image; and designating, based on the text information determining image text labels of the target image, the image text labels as image content feature information of the target image.

* * * * *